United States Patent

[11] 3,588,822

[72] Inventor Shinji Yamamoto
Hachioji-shi, Japan
[21] Appl. No. 710,488
[22] Filed Mar. 5, 1968
[45] Patented June 28, 1971
[73] Assignee Hitachi, Ltd.
Tokyo, Japan
[32] Priority Mar. 6, 1967
[33] Japan
[31] 42/13714

[54] CHARACTER RECOGNITION APPARATUS FOR IDENTIFYING CHARACTERS BY DETECTING STROKE FEATURES OF THE CHARACTERS
7 Claims, 16 Drawing Figs.

[52] U.S. Cl. 340/146.3
[51] Int. Cl. G06k 9/10
[50] Field of Search 340/146.3

[56] References Cited
UNITED STATES PATENTS

| | | | |
|---|---|---|---|
| 3,293,604 | 12/1966 | Klein et al. | 340/146.3 |
| 3,348,200 | 10/1967 | Ross | 340/146.3 |
| 3,349,372 | 10/1967 | Currie | 340/146.3 |

*Primary Examiner*—Maynard R. Wilbur
*Assistant Examiner*—Leo H. Boudreau
*Attorney*—Craig and Antonelli

ABSTRACT: The character face is divided into three zones and scanned in vertical and horizontal directions by means of a scanner to be converted into time series digital signals in response to the presence of a character image, which digital signals are fed to cascade connected three dynamic memories. From the digital signals stored in the dynamic memories stroke features are detected by a feature detecting device. The character is recognized by identifying the combination of the stroke features by means of a character identifying device. The character recognition apparatus of the invention is simple in structure and free from noise disturbance.

INVENTOR

SHINJI YAMAMOTO

BY Craig & Antonelli

ATTORNEYS

INVENTOR
SHINJI YAMAMOTO

BY Craig & Antonelli

ATTORNEYS

INVENTOR
SHINJI YAMAMOTO

BY Craig & Antonelli
ATTORNEYS

INVENTOR
SHINJI YAMAMOTO

BY Craig & Antonelli
ATTORNEYS

INVENTOR
SHINJI YAMAMOTO

BY Craig & Antonelli
ATTORNEYS

CHARACTER RECOGNITION APPARATUS FOR IDENTIFYING CHARACTERS BY DETECTING STROKE FEATURES OF THE CHARACTERS

BACKGROUND OF THE INVENTION

1. Field of the Invention

The present invention relates to a character recognition apparatus for identifying characters by detecting where stroke features of a standardized character are present on the character face.

2. Description of the Prior Art

Various kinds of character recognition apparatuses are known, among which those recognizing many kinds of characters are complicated in structure and very expensive. Consequently, many of those in practical use can recognize only specified standardized characters, and employ the so-called zone dividing method in which character identification is effected by dividing the character face into a plurality of regions or zones and by detecting stroke features of a specified character which are present in respective regions. According to this method, electrical digital signals representative of the presence of parts of a character in a number of meshes are obtained by scanning the character face with a flying spot and converting the obtained light signals into electrical signals by means of a photoelectric transducer or by projecting an image of the character on an array of photosensitive elements. The digital signals are stored at every region or zone preliminarily provided for the purpose of easy detection of the strokes of the standardized character. The stroke feature present in each region is detected by being subjected to various logical treatments of the digital signals in each region. Then, the character is recognized by logically identifying the combination of these strokes.

The difficulties accompanying this method are that, first, the position of a character should be exactly decided so that a correct zone division should be carried out; second, a correct stroke feature should be detected from a number of digital signals in each region without being influenced by noises such as partial defects and stains of the strokes. To know the exact position, there are known a method in which at first only the position of the character is detected by the first scanning, and then the zone division is performed by the second scanning, and another method in which each of all digital signals for one character is independently stored in a shift register, and, while shifting the digital signals, the zone division is effected when the digital signals representative of the character come to a predetermined position in a shift register. The former method has the disadvantage that the first and second scanning must be carried out for recognition of one character, and hence not only the recognizing speed is reduced to one-half, but also an additional device for position detection of the character is necessary, while the latter method has the disadvantage that a register sufficient for storing the digital signals for one character is necessary, resulting in a very expensive apparatus.

To prevent the influence of noises, there is known a method in which a so-called normalizing device is provided which takes signals from surrounding meshes into consideration when deciding the presence of the image of a character in a mesh. According to this method, the signals from the surrounding meshes are independently stored and a normalizing device is necessary, and hence the apparatus is complicated and expensive.

SUMMARY OF THE INVENTION

It is an object of the present invention to provide a character recognition apparatus capable of effecting an exact recognition of characters with a simple structure and without the necessity of signal normalization.

It is another object of the present invention to provide a character recognition apparatus capable of detecting the position of a character by utilizing the detected signal of the stroke of the character without provided with a separate character position detecting device.

The present invention is characterized by serially connecting a plurality of dynamic memories comprised of dynamic shift registers or delay lines and successively cutting off the connections between the dynamic memories by means of at least a gate circuit controlled by at least a signal representative of the zone division in a scanning direction, thereby storing digital signals obtained by scanning each zone of the character in a corresponding dynamic memory.

The present invention is also characterized by providing means for detecting the position of the character in a scanning direction from stroke detection signals detected by a stroke detecting device provided at predetermined positions in the dynamic memories.

DESCRIPTION OF THE PREFERRED EMBODIMENTS

Figure 1:
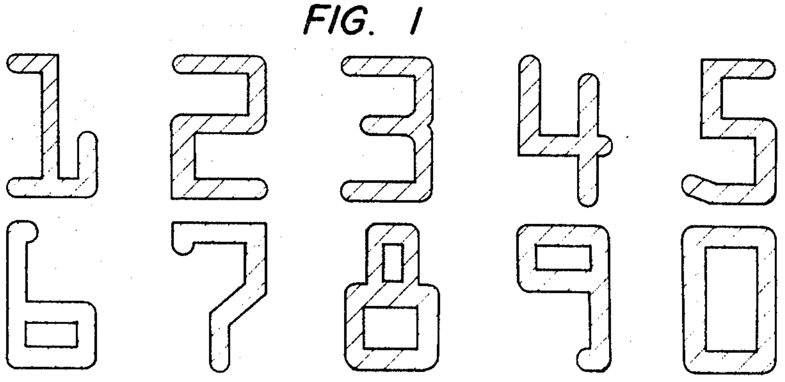
FIG. 1 is an example of the standardized character types which can be recognized by the apparatus of the present invention.

FIG. 1 shows an example of standardized characters which the character recognition apparatus according to the present invention can recognize. This example is the so-called ISO–A type-font proposed by ISO (International Organization for Standardization), an organization of UNESCO. As is evident from this type-font, in order to effect an exact character recognition with as simple an apparatus as possible, it is advantageous to constitute characters by linear strokes which are easy to detect and especially by linear strokes in vertical and horizontal directions as much as possible.

Figure 2:
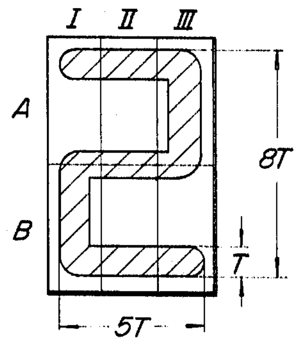
FIG. 2 is an example of zone division.

FIG. 2 shows an example of zone division in which a character is divided into six regions, i.e. into two zones A and B in horizontal direction and three zones I, II and III in vertical direction. The ISO–A type is constructed in such a manner that if the thickness of the stroke is T, the height of the character is 8T, and the width of the character is 5T. To recognize characters shown in FIG. 1, if the presence of vertical stroke components in the six regions are detected and it is coded in such a way as shown in Table 1, there is no distinction between character 4 and 9 and between 8 and 0, but the remaining characters in the ISO–A type-font can be identified as seen from Table 1. However, by detecting the number of times a vertical scanning line intersects horizontal strokes to represent the case in which the scanning line intersects two horizontal strokes interspaced by a long vertical space as LW, the case in which the scanning line intersects two horizontal strokes interspaced by a short vertical space as 1SW, and the case in which the scanning line intersects three horizontal strokes interspaced by two short vertical spaces as 2SW, the characters 4, 9, 8 and 0 can be distinguished.

A truth table for identifying the characters of the ISO–A type-font by signals representative of the presence of the above-mentioned stroke features is represented by Table 1. In Table 1, I–A, I–B, ...... represent stroke features in the vertical direction present in the regions I–A, I–B, ......, respectively, and the mark 0 represents the presence of vertical or horizontal stroke features therein and the mark "-" represents the absence thereof.

TABLE 1

| | I-A | I-B | II-A | II-B | III-A | III-B | 1SW | 2SW | LW |
|---|---|---|---|---|---|---|---|---|---|
| 1 | — | — | 0 | 0 | — | 0 | | | |
| 2 | — | 0 | — | — | 0 | — | | | |
| 3 | — | — | — | — | 0 | 0 | | | |
| 4 | 0 | — | — | — | 0 | 0 | — | — | — |
| 5 | 0 | — | — | — | — | 0 | | | |
| 6 | 0 | 0 | — | — | — | 0 | | | |
| 7 | — | — | — | 0 | 0 | — | | | |
| 8 | 0 | 0 | — | — | 0 | 0 | — | 0 | — |
| 9 | 0 | — | — | — | 0 | 0 | 0 | — | — |
| 0 | 0 | 0 | — | — | 0 | 0 | — | — | 0 |

It is evident that characters other than numerals can similarly be identified by detecting stroke features present in each region.

As is evident from the foregoing description, according to the present invention different truth tables are formed depending on the style of the standardized character, the manner of zone division, and the kind of the features to be detected, resulting in different logics for character identification. Once the scanning mode is determined, the stroke features which can be detected are substantially determined.

In the present invention a character is scanned in a predetermined direction, for example from top to bottom. Each time one scanning has completed, a sheet of paper carrying characters thereon is slightly shifted in a direction perpendicular to the direction of scanning, and thus the successive scanning is slightly shifted. The scanning is effected by means of, for example, a flying spot scanner and the detection is effected by means of a photomultiplier. Alternatively, an image of a character is projected on miniature photosensitive elements arranged in a predetermined direction, and an output from each photosensitive element is time-sequentially derived. Therefore, for extracting the stroke feature, it is advantageous to detect the stroke components in a scanning direction or the number of times the scanning line intersects strokes perpendicular to the scanning direction, for which reason characters consisting of strokes in a scanning direction and in a direction perpendicular to the scanning direction, for example, the ISO-A type-font, are employed as the standardized characters.

Figure 4:
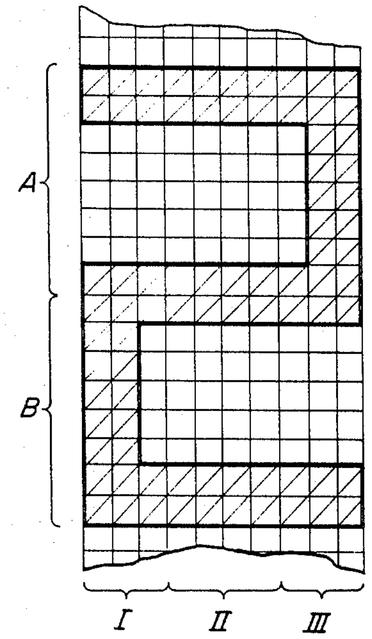
FIG. 4 is an example of division of a character face into meshes by scanning.

FIG. 4 shows an example of the scanning of a character in which the scanning is performed in vertical and lateral directions with an interval of one half the thickness T of the stroke. The character face is divided into 16×10 meshes each having an area of ½T×½T. If it is assumed that the signal is digitized each time the scan advances by ½T in a vertical direction and further assumed that a character may be shifted upward or downward by approximately one half the height of the character, the character face has a signal of 32 bits for one vertical scanning, and hence a memory of 32 bits is necessary for one vertical scanning to store the signal. The zones I, II and III to be divided into meshes consist of three columns, four columns, and three columns, respectively, as shown in FIG. 4.

In the embodiments described hereinbelow the vertical scanning of a character is assumed to be carried out from top to bottom and the lateral scanning from right to left by way of description.

Figure 5:
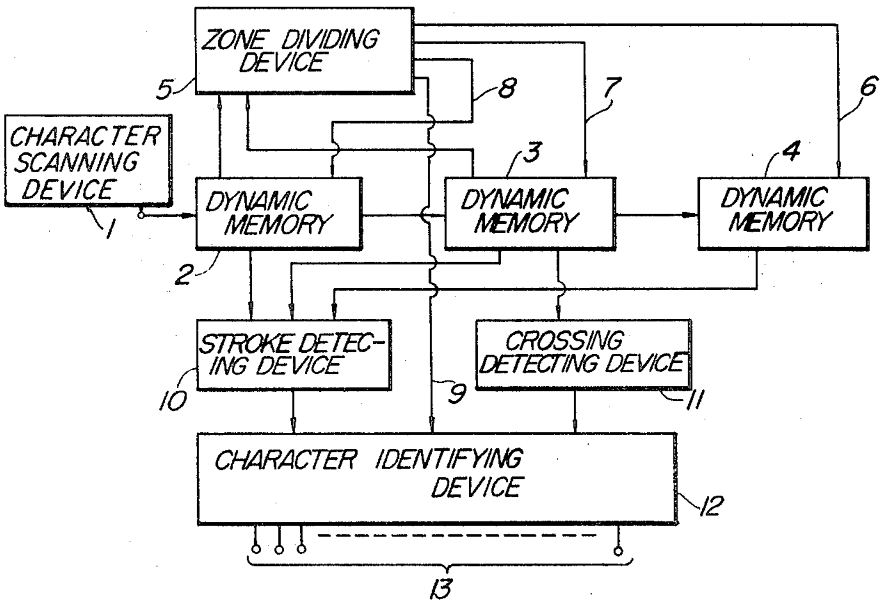
FIG. 5 is a schematic diagram of an embodiment of the present invention.

FIG. 5 is a schematic diagram of an embodiment of the present invention. In a character scanning device 1, a train of digital signals are generated by the scanning as described, for example, with reference to FIG. 4. The digital signals successively enter a dynamic memory 2 and are transferred to dynamic memories 3 and 4 connected in series with the dynamic memory 2. To the dynamic memories 2 and 3 is coupled a zone dividing device 5 which, upon detection of the signal representative of the appearance of an image of a character from the signals transferred in the dynamic memories 2 and 3, generates a start signal on a signal line 6. With the start signal the dynamic memory 4 forms a feedback loop to initiate the storage of the input signals. As soon as the signals for the first zone I consisting of three columns have been stored in the dynamic memory, the zone dividing device 5 generates a zone dividing signal on a signal line 7 to cut off the connection between the memory 3 and the memory 4. Simultaneously, the memory 3 forms a feedback loop to initiate the storage of the input signals for the second zone II. As soon as the signals for the second zone II consisting of four columns have been stored in the dynamic memory 3, the zone dividing device 5 similarly generates a zone dividing signal on a signal line 8 to cut off the connection between the dynamic memories 2 and 3. Simultaneously, a feedback loop is formed for the dynamic memory 2 to enable the memory 2 to store the signals for the third zone III consisting of three columns. In this manner the digital signals for the zones I, II and III divided in the direction of the scanning are independently stored in the dynamic memories 4, 3 and 2, respectively. Consequently, it is evident that the same number of dynamic memories as that of the zones divided in the direction of the scanning are necessary.

From the digital signals for each of the zones stored in the dynamic memory 2, 3, or 4 the presence of the stroke in the scanning direction for each zone is detected by means of a stroke detecting device 10. From the signals stored in the memory 3 or the signals under being transferred in the memory 2 the number of the horizontal strokes intersected by a scanning line is detected by means of a crossing detecting device 11.

The stroke feature in each zone detected by the stroke detecting device 10 and the crossing detecting device 11 is fed to a character identifying device 12 and output signals representative of the recognized character are derived from output terminals 13 of the character identifying device 12 after an end signal representative of the end of the scanning of one character has been fed from the zone dividing device 5 through a signal line 9 to the character identifying device 12. The device 12 is to logically identify the truth table shown as Table 1, for example, and hence can be constituted by the known circuits such as a diode decoder, etc. When the identification of the character has finished, the memories 2, 3, and 4 and the zone dividing device 5 are reset to the previous states before the entry of the signals of the next character from the character scanning device 1.

Figure 6:
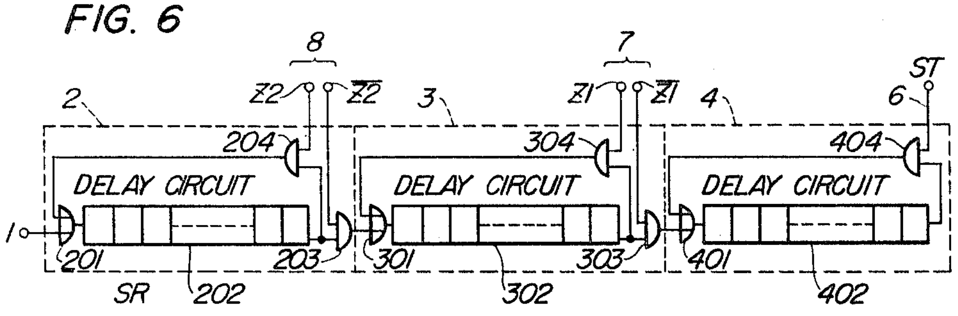
FIGS. 6 to 11 are more detailed circuit diagrams of various parts of the embodiment of FIG. 5.

FIG. 6 is a structure of the dynamic memories 2, 3 and 4 shown in FIG. 5. The memories comprises delay circuits 202, 302, and 402 constituted by, for example, shift registers SR which shift signals under the control of clock pulses. The delay circuits 202, 302, and 402 have feedback loops comprising AND circuits 204, 304, and 404 controlled by zone dividing signals Z2 and Z1 and a start signal ST, and OR circuits 201, 301, and 401, respectively. AND circuits 203 and 303 controlled by inverted signals $\overline{Z2}$ and $\overline{Z1}$ of the zone dividing signals Z2 and Z1 are provided between the delay circuits 202 and 302, and between the delay circuits 302 and 402.

When the start signal ST and the zone dividing signals Z1 and Z2 are O, the inverted signals $\overline{Z1}$ and $\overline{Z2}$ are 1, and hence a signal entered the delay circuit 202 from the input terminal is successively transferred to the delay circuit 402 through the delay circuit 302, and then overflowed and disappears at the end of the delay circuit 402. If the signals ST, Z1 and Z2 are successively inverted to 1 at each end of a predetermined scanning, the AND circuits 404, 304 and 204 are successively opened to form the feedback loops. At the same time the signals $\overline{Z1}$ and $\overline{Z2}$ are successively inverted to 0. Then, the AND circuits 303 and 203 are successively closed and the input signals for each zone are stored in the dynamic memories 2, 3 and 4, respectively.

The delay circuits may be constituted, for example, by the shift registers SR composed of a number of serially connected flip-flop circuits, as stated above. Since it is desirable to store bits for each scanning line as a a unit, the bit number of each memory is, for example, 32 which is the bit number for one scanning line as stated above referring to FIG. 4. Consequently, the input signals for a plurality of scanning lines enter each of the dynamic memories 2, 3 and 4, in other words, the input signals for the plurality of scanning lines enter in overlapped manner for each bit. Thus, the partial thinness or defect of a stroke is compensated for. In this manner strokes, in particular strokes in the scanning direction, present in each zone are surely stored in the dynamic memories 2, 3 and 4. An AND circuit, in which the output signal is controlled by the signal ST, Z1 or Z2, can be used as the AND circuits 203, 204, 303, 304 and 404; for example, a well known gate circuit constituted by transistors can be used.

Next, an example of the zone dividing device 5 shown in FIG. 5 will be described. The zone dividing device comprises a character initiation detecting device and a zone dividing signal generating device.

Figures 7A, 7B, 7C, 7D:
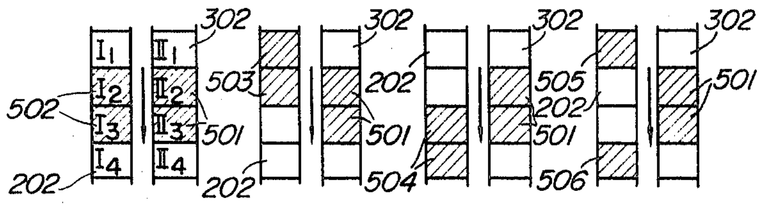

It is a necessary condition for preventing a misrecognition of character to exactly divide the character face into zones. Therefore, it should be exactly known from which scanning the detection of an image of a character is started. Here, the character initiation detecting device will be constructed with the assumption that a noise due to a stain of the size of the order of the thickness T of the stroke of the image of the character is inevitable. If it is assumed that a stain of the size of at most T×T, i.e. 2×2 bits is present as shown in FIG. 7*a*, the image of the character cannot be detected until input signals having a spread equal to or larger than that of the stain come in. When the input signals are being transferred from top to bottom as shown in in FIGS. 7*a* to 7*d* in the delay circuits 302 and 202 shown in FIG. 6, even if the digital signals representative of the presence of a stroke are detected at the positions 501 and 502 as shown in FIG. 7*a*, the appearance of such input signals is not regarded as the initiation of a character. However, when the positions of the signals are at 501 and 503, 501 and 504, and 501, 505 and 506, i.e. when the input signals has a spread having three bits or more in the scanning direction and two bits (corresponding to two scanning lines) or more in a direction perpendicular to the scanning direction, the appearance of such input signals is regarded as the initiation of a character and storage of the input signals is initiated in the memories.

Figure 8:
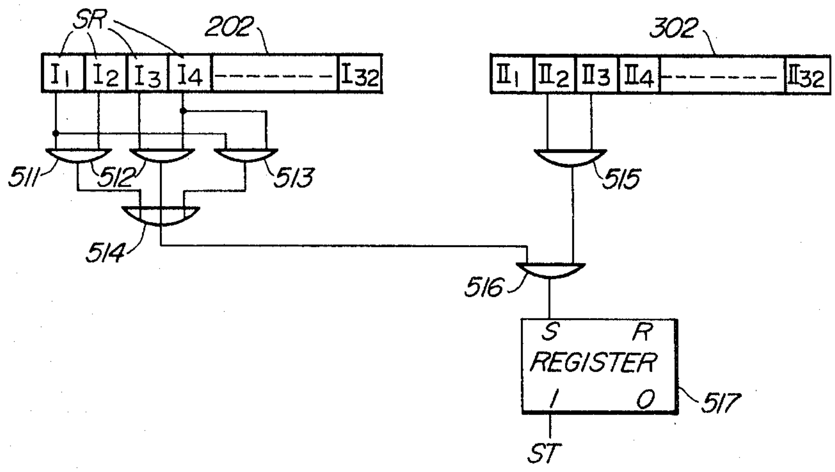

FIG. 8 is a schematic circuit diagram of an example of the character initiation detecting device. In FIG. 8 the delay circuits 202 and 302 are assumed to be constituted by well known shift registers composed of flip-flop circuits or the like which are of $I_1$ to $I_{32}$ and $II_1$ *to* $II_{32}$ bits, respectively. Then the logic which determines the character initiation described referring to FIG. 7 is given by formula (1).

$$ST = II_2 II_3 \cdot (I_1 \cdot I_2 + I_3 \cdot I_4 + I_1 \cdot I_4) \qquad (1)$$

where the symbol (·) represents logical product and the symbol (+) represents logical sum. From the logical formula (1) a gate circuit for generating a signal indicative of the initiation of character can be constituted by AND circuits 511, 512, 513, 515, and 516 and OR circuit 514. An output from this gate circuit is retained as the start signal ST by feeding the output to a set input terminal S of a register consisting of flip-flops. After the scanning for one character and the identification of the character have finished, a reset signal is fed to a reset terminal R of the register 517 to reset the start signal ST to O.

Figure 9:
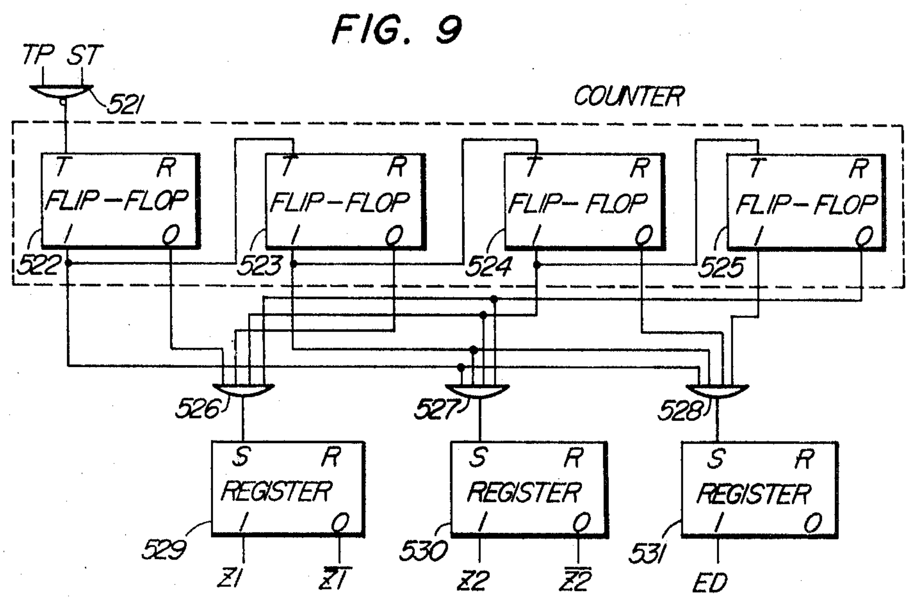

FIG. 9 shows an example of the zone dividing signal generating device. Flip-flop circuits 522 to 525 have respective trigger input terminal T. An output signal on 1 side of each of the flip-flop circuits 522, 523, and 524 is fed to the trigger input terminal T of the next stage flip-flop circuit to constitute a well known counter. In operation, when an output of the preceding stage changes from 1 to 0, the signal is fed to the trigger input terminal of the next stage flip-flop circuit to invert it. Therefore, while the preceding stage flip-flop circuit is inverted twice, the next stage flip-flop circuit is inverted only once. Thus, a binary count is effected. A NAND circuit 521 having two inputs, one of which is the start signal ST, and the other of which is a timing pulse TP to be applied each time one scanning has completed, is connected with the trigger input terminal T of the first stage flip-flop circuit 522. Each time both of the two signals ST and TP are 1 the flip-flop circuit 522 is inverted. Since the start signal ST becomes 1 when the appearance of the character is detected, the counter counts the number of scans made after the appearance of the character.

If it is assumed that a zone division as shown in FIG. 4 is carried out, in the dynamic memory 4 digital signals for three scanning lines in the zone I are stored after the start signal ST is fed, in the dynamic memory 3 digital signals for four scanning lines in the zone II are stored after the zone dividing signal Z1 is fed, and in the dynamic memory 2 digital signals for at least three scanning lines in the zone III should be stored after the zone dividing signal Z2 is fed. However, since each of the dynamic memories 2, 3 and 4 are to store signals each shifted by one scanning line, the zone dividing signal Z1 is 1 when the content of the counter is binary 0100 (decimal 4) and the signals of the character image for three scanning lines are stored in the dynamic memory 4, and the zone dividing signal Z2 should be 1 when the content of the counter is binary 0111 (decimal 7) and the signals of the character image for four scanning lines are stored in the dynamic memory 3. Since the end signal ED showing the end of the scanning for one character must be delivered after the content of the counter becomes binary 1001 (decimal 9), the end signal ED is set to be delivered when the content of the counter becomes binary 1011 (decimal 11) leaving a margin of two scanning lines. Accordingly, it is evident that the decoding of the output signals from the flip-flop circuits constituting the counter ought to be done by gate circuits respectively consisting of AND circuits 526, 527, and 528. By feeding outputs from these gate circuits to respective set input terminals S of registers 529, 530, and 531 each consisting of flip-flops, the zone dividing signals Z1 and Z2, the inverted signals $\overline{Z1}$ and $\overline{Z2}$ thereof, and the end signal ED are retained in the registers 529, 530, and 531, respectively. The registers 529, 530, 531 are returned to the state in which the zone dividing signals Z1 and Z2 and the end signal ED are 0, and the inverted signals $\overline{Z1}$ and $\overline{Z2}$ are 1 by the action of the aforementioned reset signals fed to respective reset terminals R after the end signal ED has been delivered.

Figure 10:
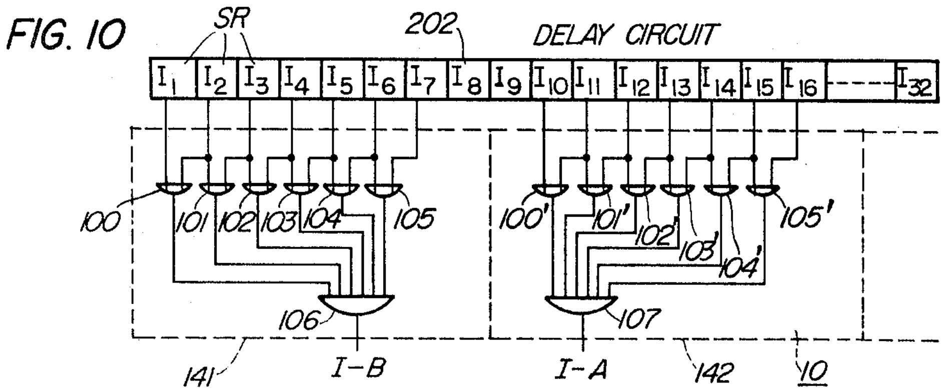

FIG. 10 shows an example of a part of the stroke detecting device 10 shown in FIG. 5. To each of the delay circuits 202, 302, and 402 shown in FIG. 6 gate circuits as shown in FIG. 10 are provided to constitute the stroke detecting device. As has been stated above, the character image signals for a plurality of scanning lines present in the zones I, II, and III are fed in an overlapped manner to the delay circuits 202, 302, and 402, respectively. Accordingly, if there are strokes in the scanning direction in the zones, the strokes will be surely stored. The stroke features I–A and I–B are defined in terms of the signals under being transferred in the delay circuit 202 such that they have a length of five bits or more, and, taking partial thinness or defect of the character image into consideration, they are continuous at least every other bit. If it is assumed that the delay circuit 202 is constituted by bits $I_1$ to $I_{32}$, such stroke features can be represented by, for example, the following logical formula:

$$\left.\begin{aligned} I-B &= (I_1+I_2)\cdot(I_2+I_3)\cdot(I_3+I_4)\cdot(I_4+I_5)\cdot(I_5+I_6)\cdot(I_6+I_7) \\ I-A &= (I_{10}+I_{11})\cdot(I_{11}+I_{12})\cdot(I_{12}+I_{13})\cdot(I_{13}+I_{14})\cdot(I_{14}+I_{15})\cdot(I_{15}+I_{16}) \end{aligned}\right\} \qquad (2)$$

From Formula (2), the stroke feature I–B or I–A can be detected by forming OR outputs of each adjacent two bits of output signals $I_1$ to $I_{32}$ by means of OR circuits 100 to 105 or 100′ to 105′ and further forming an AND output of the OR outputs by means of an AND circuit 106 or 107. While the stored signals are being transferred, when the stroke feature I–B or I–A is 1, it indicates the presence of the vertical strokes in the upper half or the lower half of the zone I, respectively. When both of the features are 1, they indicate the presence of a long vertical stroke.

Although the illustration of FIG. 10 is made concerning the zone I, similar operations are applied to the remaining zones II and III.

Figure 11:
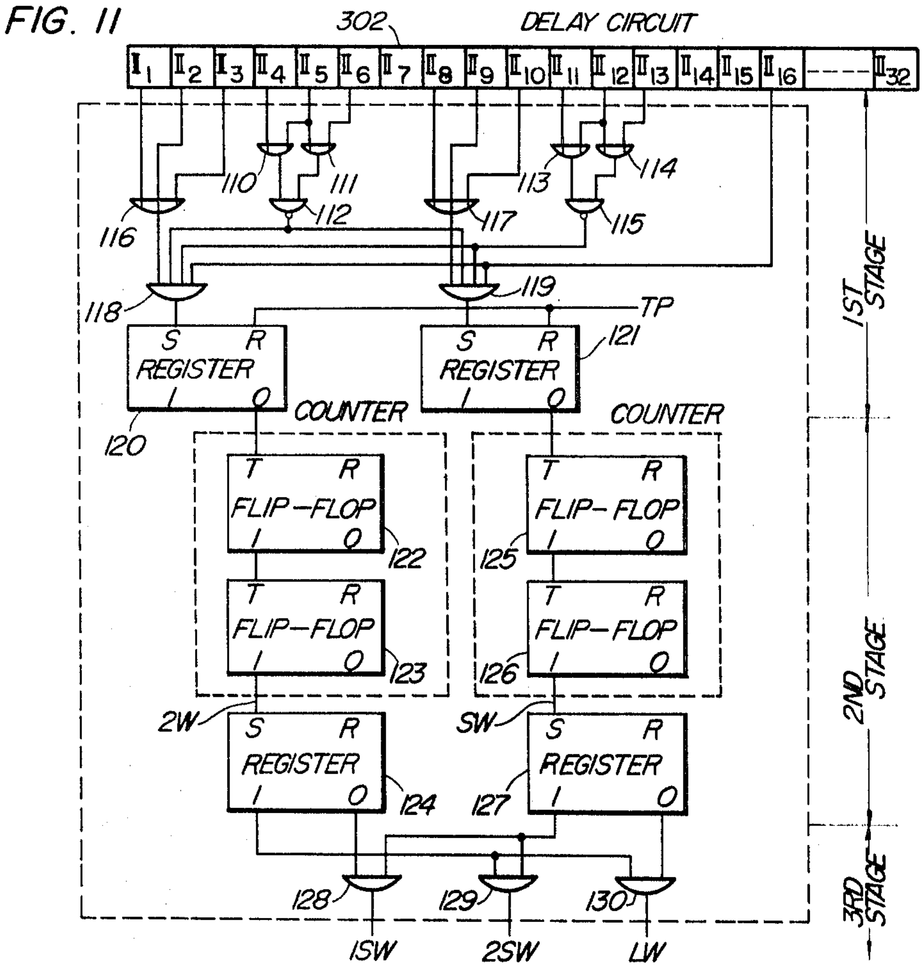

FIG. 11 shows an example of the crossing detecting device 11 shown in FIG. 5. Strokes perpendicular to scanning lines are present at determined positions in a standardized character. For example, when the ISO–A type-font shown in FIG. 1 is scanned from top to bottom, lateral strokes are present mainly at three positions, top, middle, and bottom of the character. Therefore, digitized signals representative of the presence of lateral strokes delivered from the scanning device are transferred in the delay circuits with specified spaces.

Figure 3:
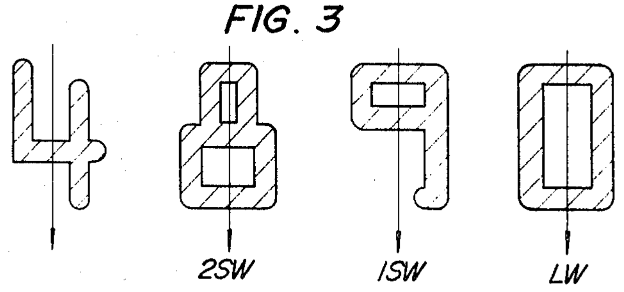
FIG. 3 is a diagram showing a manner of intersection of a scanning line with standardized characters.

When 1SW, 2SW, and LW shown in FIG. 3 and Table 1 are detected as lateral stroke features, these three features may be detected independently. However, if the case in which there are at least two lateral strokes interspaced by a short space is represented as SW, and if the case in which there are lateral strokes at least at the top and the bottom of a character interspaced by a space is represented as 2W, the above-mentioned lateral stroke features 1SW, 2SW, and LW can be obtained by a logical treatment of SW and 2W. In other words, when only the feature SW is detected, it indicates the existence of the feature 1SW, when the features SW and 2W are obtained simultaneously, it indicates the existence of the feature 2SW, and when only the feature 2W is detected, it indicates the existence of the feature LW. Thus, the two features SW and 2W have only to be detected.

The crossing detecting device 11 is connected with bits $II_1$ to $II_{16}$ of the shift register constituting the delay circuit 302, and effects logical treatments of outputs from the bits $II_1$ to $II_{16}$ by means of its gate circuits. A logical circuit for detecting the features SW and 2W will first be described. While digital signals are transferred in the delay circuit 302, when the output 1 representative of the presence of character image is generated in bit $II_{16}$ and either one of the bits $II_8$ to $II_{10}$, and there are the signals representative of the absence of the character image in consecutive two bits of each group of the bits $II_4$ to $II_6$ and $II_{11}$ to $II_{13}$, it can be seen that there are two lateral strokes interspaced by a short space. Similarly, when there are the outputs 1 in the bit $II_{16}$ and either one of the bits $II_1$ to $II_3$and there are the signals representative of the absence of the character image in consecutive two bits of each group of the bits $II_4$ to $II_6$ and $II_{11}$ to $II_{13}$, it can be seen that there are lateral strokes at the top and the bottom of the character. As stated above, if the former crossing feature is represented by SW, and if the latter feature is represented by 2W, the identification logic thereof is as follows:

$$\left.\begin{aligned} SW&=(II_8+II_9+II_{10})\cdot II_{16}\cdot(\overline{II_4}\cdot\overline{II_5}+\overline{II_5}\cdot\overline{II_6})\cdot(\overline{II_{11}}\cdot\overline{II_{12}}+\overline{II_{12}}\cdot\overline{II_{13}})\\ 2W&=(II_1+II_2+II_3)\cdot II_{16}\cdot(\overline{II_4}\cdot\overline{II_5}+\overline{II_5}\cdot\overline{II_6})\cdot(\overline{II_{11}}.\overline{II_{12}}+\overline{II_{12}}\cdot\overline{II_{13}}) \end{aligned}\right\} \quad (3)$$

where the symbol (—) represents an inverted signal. The third and fourth factors of the right-hand member of the first formula of Formula (3) can be subjected to the following logical transformation:

$$\overline{II_4}\cdot\overline{II_5}+\overline{II_5}\cdot\overline{II_6}=\overline{(II_4+II_5)\cdot(II_5+II_6)}$$
$$\overline{II_{11}}\cdot\overline{II_{12}}+\overline{II_{12}}\cdot\overline{II_{13}}=\overline{(II_{11}+II_{12})\cdot(II_{12}+II_{13})}$$

Hence, Formula (3) can be transformed into $$\left.\begin{aligned} SW&=(II_8+II_9+II_{10})\cdot II_{16}\cdot\overline{(II_4+II_5)\cdot(II_5+II_6)}\cdot\overline{(II_{11}+II_{12})\cdot(II_{12}+II_{13})}\\ 2W&=(II_1+II_2+II_3)\cdot II_{16}\cdot\overline{(II_4+II_5)\cdot(II_5+II_6)}\cdot\overline{(II_{11}+II_{12})\cdot(II_{12}+II_{13})} \end{aligned}\right\} \quad (3')$$

The logics $\overline{(II_4+II_5)\cdot(II_5+II_6)}$ and $\overline{(II_{11}+II_{12})\cdot(II_{12}+II_{13})}$ can be constituted by OR circuits 110 and 111 and a NAND circuit 112 and OR circuits 113 and 114 and a NAND circuit 115, respectively, and the logics $(II_1+II_2+II_3)$ and $(II_8+II_9+II_{10})$ can be constituted by OR circuits 116 and 117, respectively. Consequently, from Formula (3′) the features SW and 2W are, as outputs of AND circuits 118 and 119, set and retained in registers 120 and 121, respectively, consisting of flip-flops. If there are no noises such as stains on the character face, the feature SW or 2W is ought to be detected. However, when there is a stain of the same spacing as that of the horizontal strokes, there is a danger that the features SW and 2W are misdetected. Therefore, it is determined that the feature SW or 2W ought not to be detected until the same feature appears over at least two scannings.

Flip-flop circuits 122 and 123, 125 and 126 constitute two bit binary counters and count one by one each time the registers 120 and 121 are set. Since the registers 120 and 121 are reset at the end of one scanning under the control of the timing pulse TP, they are again set and counted by the counter if the features SW and 2W appear again. When the counter counts twice, the features SW and 2W are more surely held due to the fact that registers 124 and 127 are set by output signals of the flip-flop circuits 123 and 126, respectively. The counter and the registers 124 and 127 are set by the reset signal after the identification of the character has completed.

As is evident from the foregoing description of operation, the crossing detecting device 11 can not only be connected to the delay circuit 302 as shown in FIG. 11, but also be connected to the delay circuit 202 of the dynamic memory 2 in all the same manner, since the cross detecting device 11 instantaneously catches the character signals being transferred in the memories and extracts the features.

The features SW and 2W may be utilized for character identification as they are. However, if gate circuits are formed of AND circuits 128, 129, and 130 according to the logics $1SW=SW\cdot\overline{2W}$, $2SW=SW\cdot 2W$, and $LW=\overline{SW}\cdot 2W$ for the purpose of obtaining the features 1SW, 2SW, and LW shown in Table 1, the features 1SW, 2SW, and LW are obtained as output signals of the AND circuits 128, 129, and 130, respectively.

Among the output signals representative of each of the above-mentioned features of the character, the signals 1SW, 2SW, and LW are level signals. However, I–A, I–B, II–A, II–B, III–A, and III–B representative of vertical strokes are changing every moment depending on the positions of character signals being transferred in the memories 2, 3, and 4. Therefore, unless the right position of the character signal is detected and synchronized with character identification, right identification is impossible.

Figure 12:
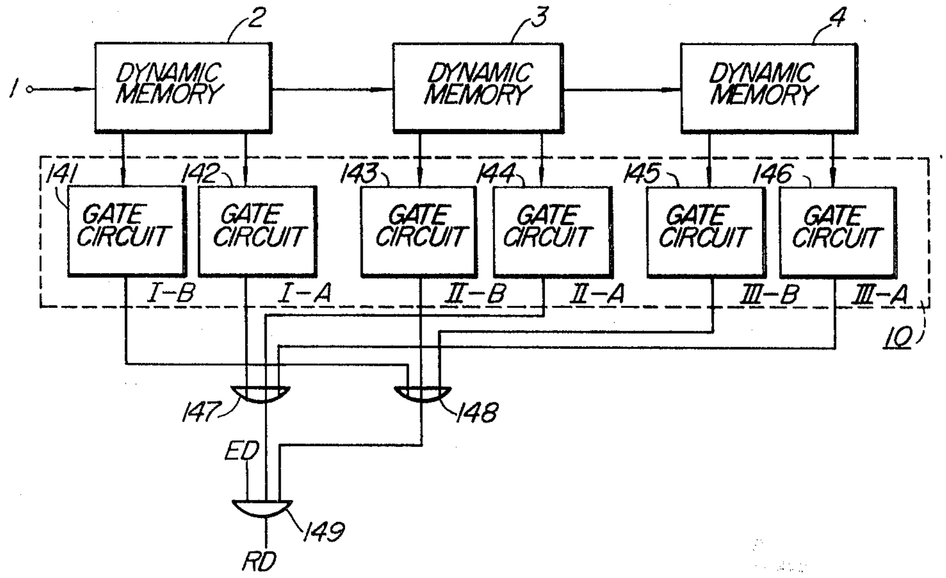
FIG. 12 is an embodiment of the position detecting device employed in the present invention.

FIG. 12 is an example of the character position detecting device for detecting character positions in the delay circuits employed in the present invention. In FIG. 12, dynamic memories 2, 3, and 4 and stroke detecting device 10 are the same as those shown in FIG. 5. Therefore, signals entered from the input terminal are successively stored in the memories 2, 3, and 4 for each zone as has been described with reference to FIG. 5. Stroke features are continually detected from these stored signals by means of the stroke detecting device 10, an example of which is shown in FIG. 10. The stroke features I–B, I–A, II–B, II–A, III–B, and III–A are detected by gate circuits 141 to 146, respectively, as shown in FIG. 10.

Next, position detection of the character will be described with respect to an example of recognizing the characters of the ISO–A type-font shown in FIG. 1. As is evident from FIG. 1, every character necessarily has the stroke features in the scanning direction in both zones A and B. For example, the character 2 has stroke features III–A and I–B in the scanning direction, i.e., in vertical direction which are respectively in the zones A and B as is evident from FIG. 2. The remaining characters also have the stroke features in vertical direction in both zones A and B as is evident from the truth table of Table 1. Then, it is considered that the stored character image signals are at the exact positions in the dynamic memories 2, 3, and 4 when at least one of the feature I–A, II–A, and III–A and at least one of the features I–B, II–B, and III–B are simultaneously obtained by the stroke detecting device 10. Therefore, when the scanning of one character has been completed to deliver the end signal and when the logic represented by the following formula is realized, a signal RD representing the exact position of the character is delivered.

$$RD=\{(I-B)+(II-B)+(III-B)\}\cdot\{(I-A)+(II-A)+(III-A)\}\cdot ED$$

The logic of Formula (4) is operated by OR circuits in FIG. 12 such that the logical sum of I–4, II–A, and III–A derived from an OR circuit 147 and the logical sum of I–B, II–B, and III–B derived from an OR circuit 148 are fed, together with the end signal ED, to an AND circuit 149 to derive the position signal RD therefrom. According to the present invention, the stroke features in the scanning direction can surely be detected without being much influenced by noises such as stain, and hence the exact position of a character can be detected. Thus, correct character recognition is possible.

Although the circuit of the position detecting device of FIG. 12 was constructed on the assumption that there are stroke features in the scanning direction in both zones A and B without fail, there are cases in which recognition of a character having a stroke feature in the scanning direction only in either one of the zones A and B such as Y, or of a character having no stroke characteristics such as X or "-"is necessary.

Figure 13:
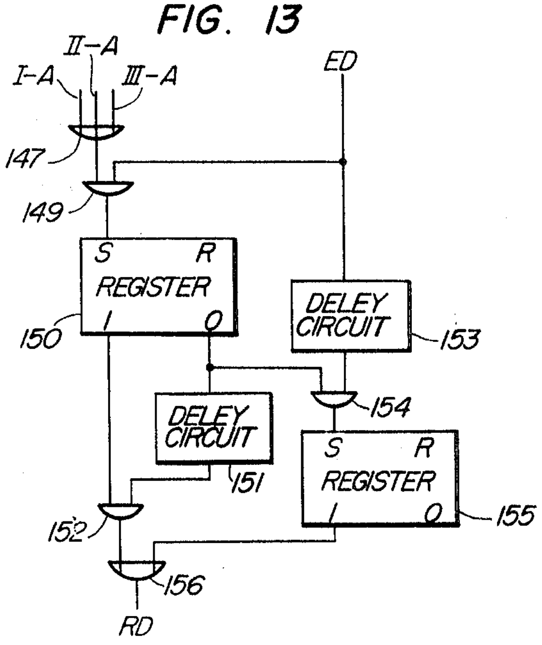
FIG. 13 is another embodiment of the position detecting device employed in the present invention.

FIG. 13 shows another example of the position detecting device. This embodiment is so construction that the position signal RD can be generated even when there are no stroke feature in the scanning direction. The position detecting device of FIG. 13 consists of a part which detects the position of a character when there is a stroke feature in the scanning direction in the zone A or B and a part which detects the position when there is no such feature. The former position detecting part generates the position signal RD when the stroke feature I–A, II–A or III–A appears for the first time at either one of the gate circuits 142, 144, and 146 shown in FIG. 12 after the generation of the end signal ED. The latter position detecting part generates the position signal RD to identify the character immediately when absence of the stroke feature in the scanning direction is confirmed after the generation of the end signal, because there is no necessity of detecting the exact position in the scanning direction.

A gate circuit consisting of an OR circuit 147 and an AND circuit 149, which is constituted by removing the OR circuit 148 from that of the position detecting device of FIG. 12, sets a register 150 composed of a flip-flop at the instant a stroke feature in the scanning direction is detected irrespective of it being in the zone A or B after the end signal ED is delivered. The logical product of 1 output of the register 150 and 0 output of the register 150 delayed by a delay circuit 151 is derived from an AND circuit 152 to generate a pulse of an appropriate width, by which pulse the position of the character is detected. The width of the pulse is determined depending on the delay time of the delay circuit 151. Although the delay time of the delay circuit 151 can arbitrarily be determined, the time necessary for transferring several bits in the memories is preferred. It is evident that the pulse of an appropriate width can also be obtained by employing other methods such as one in which a monostable multivibrator is operated by the rise of 1 output signal from the register 150, i.e. by employing a so-called one-shot circuit.

When there are no stroke features in the scanning direction, the register 150 is not set even after the end signal ED appeared. In this case, an output of an AND gate 154, to which "0" output of the register 150 and the end signal ED appropriately delayed by a delay circuit 153 are fed, sets a register 155 the output of which is employed to detect the position of the character having no stroke. The output of the register 155 and the output of the AND circuit 152 are fed to an OR circuit 156 to generate the position signal RD. Since the delay circuit 153 must delay the end signal ED until the absence of the stroke feature in the scanning direction becomes certain, the delay circuit 153 requires a delay time larger than that of the delay circuit 151, for example the time for one scanning. Therefore, the delay circuit 153 may be constituted not only by a mere delay element, but also by an AND circuit which is fed with an appropriate pulse and the end signal ED as input signals. The registers 150 and 155 are reset to their previous states by the reset signal after the character identification has been completed.

Although preferred embodiments of the present invention have been described mainly referring to the case in which numerals of the ISO–A type-font are recognized, various changes and modifications can be made without departing from the spirit of the present invention according to, for example, the style of the standardized character, direction of scanning, size of mesh into which the character face is divided, method of zone division, positional deviation of character, noises such as stain, thinness, or defect of character, etc. Such changes and modifications are believed to fall within the scope of the present invention.

I claim:

1. A character recognition apparatus, comprising:

character scanning means for scanning the image of a character provided on a document to generate a train of digital signals which represent the presence and nonpresence of the character image along the scanning course of said scanning means;

shift means coupled with said scanning means to be supplied with the digital train, said shift means comprising a plurality of serially aligned dynamic memories and switch means inserted between said dynamic memories to form a series delay circuit, each said dynamic memory being provided with a feed back circuit connecting its output to its input with a switch for opening and closing said feed back circuit;

zone dividing means coupled with said shift means and operatingly detecting the first appearance of the character image from the digital signal train for controlling said switch means and said switches in said shift means in such a manner that said switch means are initially rendered conductive but successively rendered nonconductive after detection of the first appearance of the character image at intervals of predetermined periods of time so as to electrically isolate each of said dynamic memories from the others beginning with the dynamic memory that is most remotely connected with respect to the scanning means, and that said switches are successively closed one after another after said detection of the first appearance of the character image so that each dynamic memory may be provided with its closed feedback circuit when the switch means at its output is rendered nonconductive;

feature detectors for detecting the presence of a predetermined feature of said character in each dynamic memory; and character identifying means for identifying a standardized character from the results of detections of said feature detectors.

2. A character recognition apparatus according to claim 1, wherein said zone dividing means comprises character initiation detector for detecting the first appearance of said character image in said shift means to generate a start signal, means for generating at least a zone dividing signal at an interval of a predetermined period of time after detection of said first appearance of the character image and means for detecting the completion of the scanning over said one character to generate an end signal.

3. A character recognition apparatus according to claim 1, wherein each of said dynamic memories comprises a delay circuit for operatingly shifting said digital signals therethrough.

4. A character recognition apparatus according to claim 1, wherein said feature detectors operatingly detect at least a stroke feature appearing in the scanning direction along which the scanning operation of the scanning means is carried out, and said character identifying means includes position detecting means for detecting the presence of the stroke feature in the scanning direction at a predetermined position in said shifting means to generate a position signal.

5. A character recognition apparatus according to claim 4, wherein said position detecting means comprises a logical circuit for generating a position signal when both a signal representative of said stroke feature in the scanning direction generated by said feature detectors and a signal representative of the completion of the scanning over one character generated by said zone dividing means are simultaneously present.

6. A character recognition apparatus according to claim 4, wherein said position detecting means comprises a circuit for generating a position signal when said feature detectors generate a signal representative of said stroke feature in the scanning direction after said zone dividing means has generated a signal representative of the completion of the scanning over one character, and a circuit for generating a position signal after the absence of said stroke feature in the scanning direction during a definite time after the generation of said signal representative of completion of said scanning has been detected.

7. In a character recognition apparatus for recognizing characters successively provided on a document, each one of said characters having one or more distinctive features, said apparatus including means for scanning successive ones of said characters one after another to generate a train of digital signals representing the presence and nonpresence of the image of each said one character along the scanning thereof, the combination comprising:

a plurality of dynamic memories each having its input and output terminals, a feedback loop connecting said output terminal to the input terminal and a switch inserted in the feedback loop, for operatingly storing therein predetermined numbers of bits of said digital signals;

switch means inserted between said plurality of dynamic memories for connecting in series therewith into a series circuit thereof when rendered conductive;

means for supplying said digital signals to the input terminal of the most closely aligned one of said serially connected dynamic memories from the scanning means;

a character initiation detector operatingly detecting the first appearance of the image of each said one character from the train of said digital signals so as to generate a start signal which closes the switch of the most remotely connected one of said serially connected dynamic memories; and zoning means coupled to said character initiation detector for controlling said switch means and said switches in said feedback loops in such a manner that said switch means are initially rendered conductive but successively rendered nonconductive after detection of the first appearance of the character image at intervals of predetermined periods of time so as to electrically isolate each of said dynamic memories from the others beginning with the dynamic memory that is most remotely connected with respect to the scanning means, and that said switches are successively closed one after another so that each dynamic memory may be provided with its closed feedback circuit when the switch means at its output is rendered nonconductive.